United States Patent [19]

Vatzov et al.

[11] Patent Number: 4,672,859
[45] Date of Patent: Jun. 16, 1987

[54] APPARATUS FOR COORDINATE POSITIONING

[75] Inventors: Vassil N. Vatzov; Krestyo T. Savov; Stefan G. Stanev, all of Botevgrad, Bulgaria

[73] Assignee: NPSK PO Poluprovodnikova Technika, Botevgrad, Bulgaria

[21] Appl. No.: 835,336

[22] Filed: Mar. 3, 1986

[51] Int. Cl.[4] .......................................... G05G 11/00
[52] U.S. Cl. ...................................... 74/479; 29/759; 269/60
[58] Field of Search ................ 29/741, 759, 740, 739; 74/479, 89.15; 269/60

[56] References Cited

U.S. PATENT DOCUMENTS 4,615,592 10/1986 Schob et al. ................ 74/479 X

Primary Examiner—Carl E. Hall

[57] ABSTRACT

Apparatus having two stepping motors mounted in two mutually perpendicular planes and connected by means of bellows clutches to a top and a bottom lead screw, onto which there are screwed-on cut nuts. The top lead screw is seated on both side in a cradle which determines the working length of the screw A, while the cut nut of the same screw is fastened to a body lying with its legs on a base and carries a mechanism for vertical lifting of the working table. The bottom lead screw is seated in a carrier. Means on the left connect the left end of the cradle to the left side of the carrier, while means on the right connect the right end of the cradle to the right side of the carrier.

3 Claims, 3 Drawing Figures

APPARATUS FOR COORDINATE POSITIONING

BACKGROUND OF THE INVENTION

This invention concerns an apparatus for coordinate positioning in general, and more particularly, for positioning of wafers, which can be used in probe tests of different states of readiness of semiconductor components and integrated circuits with quick and accurate sequence.

A known apparatus for coordinate positioning is composed of two stepping motors, connected by means of rigid clutches to lead screws, onto which are screwed-on cut nuts. One of the nuts is fastened to a body carrying a mechanism for vertical lifting of the working table. The first lead screw is seated on both sides in a cradle. The body is disposed onto a base by means of legs. The other cut nut is attached to the cradle in cantilever, while the respective lead screw is seated in two columns. The second stepping motor is attached to one of these two columns.

A disadvantage of the known apparatus is the comparatively great error due to reverse motion in the displacement of the body with the cradle, as well as the necessity of having to balance the system, a requirement which results in irregular wear.

SUMMARY OF THE INVENTION

It is, therefore, a general object of this invention to develop an apparatus for coordinate positioning, featuring increased accuracy of positioning in the direction of displacement, an apparatus which is a force-relieved device of high reliability and increased stability.

This object is achieved, according to the present invention, by an apparatus for coordinate positioning composed of two stepping motors mounted in two mutually perpendicular planes and connected by means of bellows clutches to top and bottom lead screws, onto which are screwed-on cut nuts. The top lead screw is seated on both sides on a cradle which determines the working length of the screw A, while the cut nut of the same screw is fastened to a body lying with its legs on a base and carrying a mechanism for vertical lifting of the working table.

According to the invention, the cradle is supported on the base by bearings, while its left end is connected by means of a soft joint, a left arm, a spring hinge and a strip to the left side of a carrier. The right end of the cradle is embraced by regulating arresters fastened to a clamp and by a right arm to the carrier. The configurations of the left and the right arms dispose the axis C of the working table in the center of the length of the carrier. A spring connects a pin fastened to the cradle to a pin fastened to the clamp. Guiding sleeves and a cut nut are attached to the carrier, while the respective shaft is connected on one side to a stepping motor and commonly to a column. On the other side, the shaft is seated by means of a bearing in a bush, which is mounted with great clearance to a cantilever. The cantilever and the column are fastened to the base, in the center of the working distance A. A rule is fastened to the carrier disposed between two guideways of a T-square, which is fastened on one side to the cantilever and on the other side to the column.

BRIEF DESCRIPTION OF THE DRAWINGS

For a better understanding of the invention, reference should be made to the accompanying drawings, in which there is illustrated and described a preferred embodiment of the invention. In the drawings.

DESCRIPTION OF THE PREFERRED EMBODIMENTS

Figure 1:
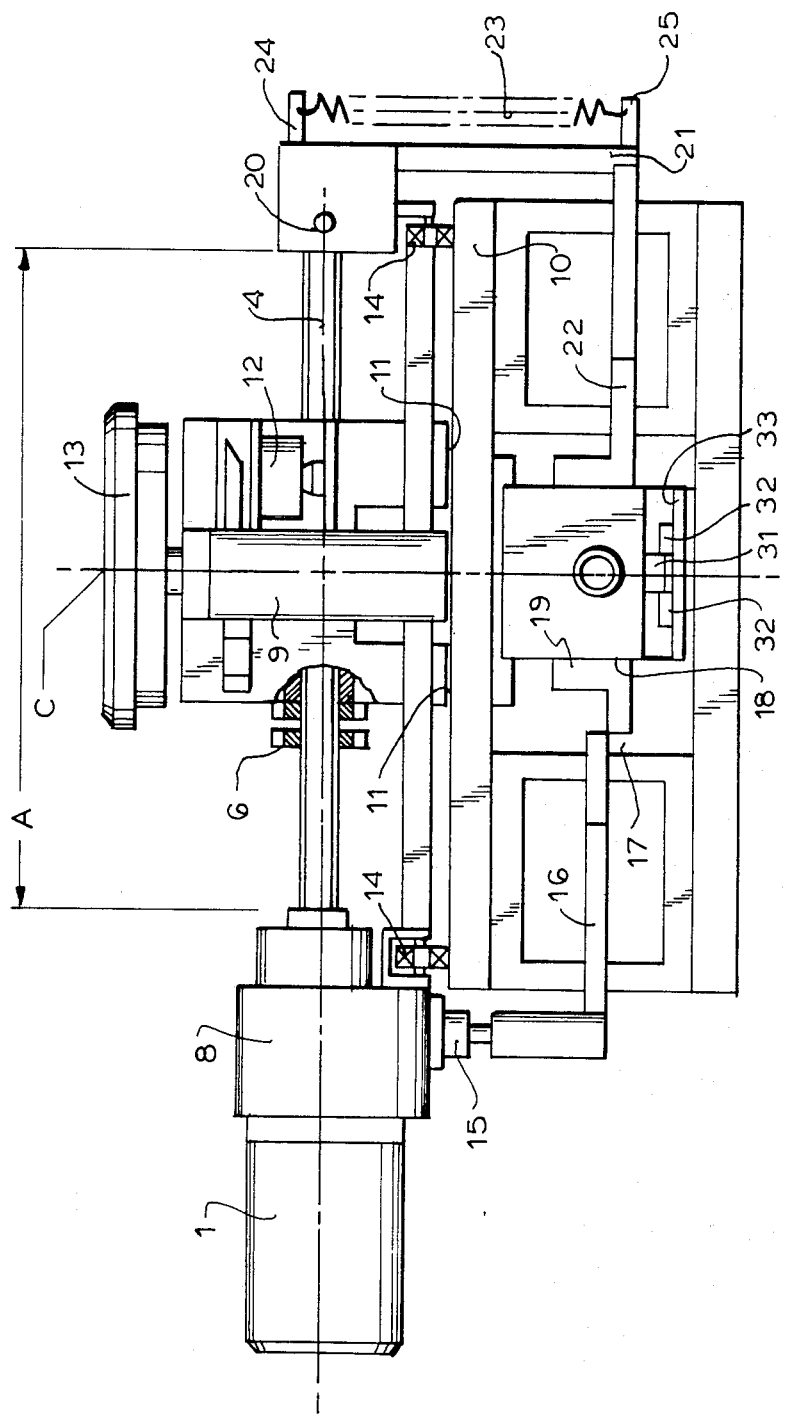
FIG. 1 is a side view of the apparatus for coordinate positioning according to the present invention.
Figure 2:
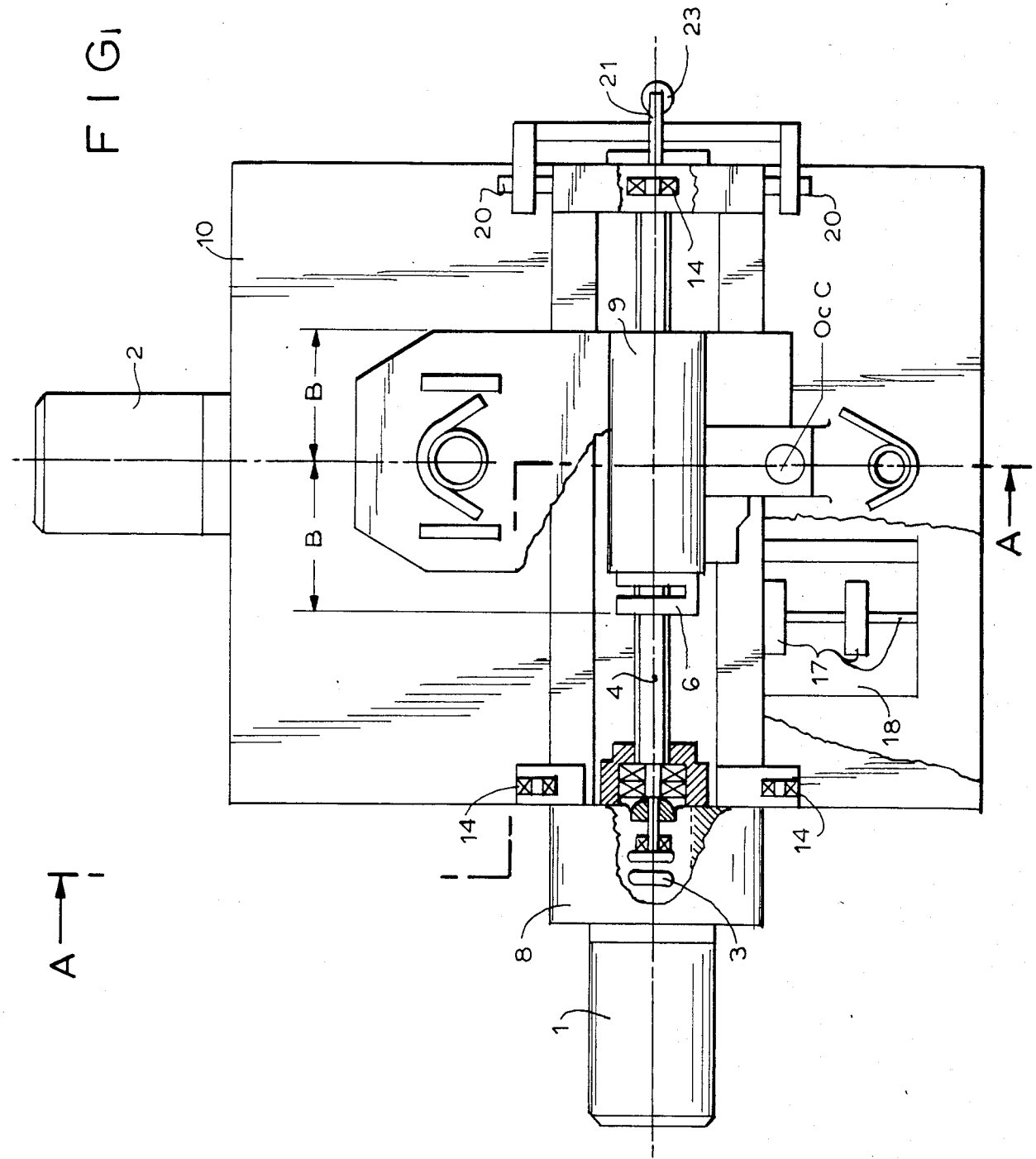
FIG. 2 is a top view of the apparatus.
Figure 3:
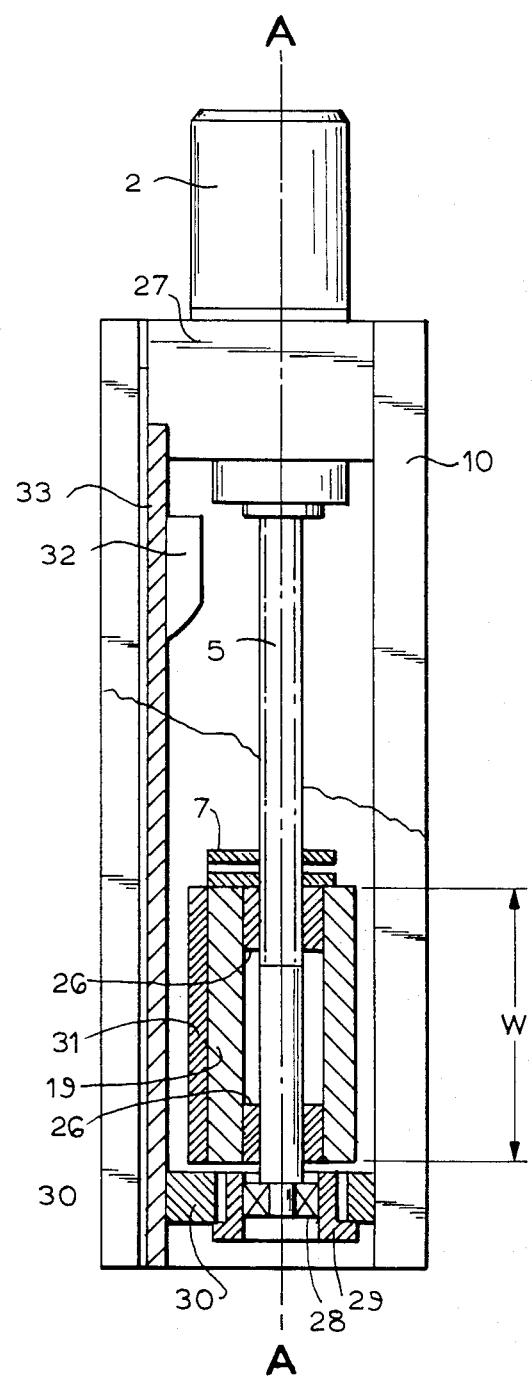
FIG. 3 is a side cross-sectional view along A—A of FIG. 2 of the apparatus.

The apparatus for coordinate positioning includes two stepping motors 1, as seen in FIG. 1, and 2, as seen in FIG. 2, connected by means of bellows clutches 3 to a top screw 4 and a bottom screw 5 onto which there are screwed-on the cut nuts 6 and 7. The top lead screw 4 is seated on both sides of a cradle 8 which determines the working length A of the screw 4, while the cut nut 6 of this same screw 4 is fastened to a body 9, which lies with its legs 11 on a base 10 and carries the mechanism for vertical lifting 12 of the working table 13. The cradle 8 is seated on the base 10 by means of bearings 14, while its left end is connected by means of a soft joint 15, a left arm 16, a spring hinge 17 and a strip 18 to the left part of a carrier 19. The right end of the cradle 8 is embraced by regulating arresters 20, which are fastened to clamp 21 and, by means of the right arm 22, to the carrier 19. The configuration of the left arm 16 and the right arm 22 dispose the axis C of the working table 13 in the center of the length W of the carrier 19. A spring 23 connects a pin 24, fastened to the cradle 8; to a pin 25, fastened to a clamp 21. Guiding sleeves 26 and the cut nut 7 are fastened to the carrier 19, and the respective shaft 5 is connected on one side through bellows clutch 3 to a stepping motor 2 and commonly to the column 27, while on the other side it is seated by means of a bearing 28 in a bush 29, which is mounted with great clearance with respect to the cantilever 30. The cantilever 30 and the column 27 are fastened to the base 10 in the center of the working distance A. Fastened to the carrier 19 there is a rule 31 which is disposed between two guideways 32 of the T-square 33. The T-square 33 is fastened on the one side to the cantilever 30 and on the other side to the column 27.

Operation of the apparatus for coordinate positioning, according to the invention, is as follows:

A determined number of pulses are fed in succession or simultaneously to two stepping motors from a control block. The pulses determine the angle of rotation of the lead screws 4 and 5. The cut nut 6 of the top lead screw 4, fastened to the body 9, provides for its longitudinal displacement and positioning, while the screw 4, the top surface of the base 10 and the legs 11 (made of a material with low friction coefficient) provide for its stable guiding. The lateral displacement is provided for by the lead screw 5 by means of the cut nut 7 and the guiding sleeves 26, such displacement being transferred to the carrier 19 and stabilized by the rule 31 and both guideways 32 of the T-square 33. The carrier transmits the motion by means of strip 18, spring hinge 17, left arm 16, and soft joint 15, on the one side, and right arm 22, clamp 21 and arresters 20, on other side, to the cradle 8, which is displaced over the top surface of base 10 over the bearings 14. The spring 23 stabilizes the connection between the carrier 19 and the cradle 8. The geometrical disposition of the bottom shaft in the center of the working distance A of the top shaft 4, as well as the symmetrical introduction of axis C of the working table 13 with respect to the length W of the carrier 19, reduce the influence of the real clearances between the lead screws and the guiding sleeves on the accuracy of positioning. The large clearance between bush 29 and cantilever 30 makes it possible to realize the obligatory adjustment of the bottom lead screw 5 with respect to the top surface of the table 10. The regulating arresters 20 and the soft joint 15 provide for a possibility of readjustment of the mutual perpendicularity between both directions of displacement.

The apparatus for coordinate positioning can operate in automatic mode by means of the known type of control.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. Apparatus for coordinate positioning of an object placed upon a working table, comprising
   first and second stepping motors mounted in two mutually perpendicular planes;
   two bellows clutches;
   a top lead screw and a bottom lead screw,
   said first stepping motor is connected by means of one said bellows clutches to said top lead screw, and said second stepping motor is connected by means of another said bellows clutches to an end of said bottom lead screw;
   two cut nuts, one each screwed onto said top lead screw and said bottom lead screw;
   a cradle having a left end and a right end, seating both ends of said top lead screw,
   said cradle defining a working length A of said top lead screw;
   a body with legs, said body is fastened to said cut nut of said top lead screw;
   a base supporting said legs of said body;
   means carried upon said base for vertical lifting of said working table;
   bearings for supporting said cradle upon said base;
   a carrier of length W for said bottom lead screw, said carrier is connected to said cut nut of said bottom lead screw, said carrier having a left side and a right side;
   means on the left connecting said left end of said cradle to said left side of said carrier;
   means on the right connecting said right end of said cradle to said right side of said carrier;
   said means on the left and said means on the right are so configured as to dispose a normal, central axis of said working table in the center of said length W of said carrier;
   a first pin, fastened to said cradle;
   a second pin, fastened to said means on the left;
   a spring connects said first pin to said second pin;
   a column carrying one end of said bottom lead screw
   guiding sleeves fastened inside said carrier, in an area in proximity to said cut nut of said bottom lead screw;
   a cantilever carrying the outer end of said bottom lead screw;
   a bearing mounted in a bush which is fastened with a great clearence in said cantilever, said bearing being at one end of said bottom lead screw opposite said bellows clutches;
   said cantilever and said column dispose said bottom lead screw in the middle of the working distance of said top lead screw;
   a T-square with guideways, one side of said T-square is fastened to said cantilever, another side of said T-square is fastened to said column; and
   a rule fastened to an outside of said carrier, said rule is disposed between said guideways of said T-squares 2. The apparatus for coordinate positioning according to claim 1, wherein
   said means on the left comprising
   a soft joint;
   a left arm;
   a spring hinge; and
   a strip, all connected in series.

3. The apparatus for coordinate positioning according to claim 1, wherein
   said means on the right comprising
   a regulating arresters;
   a clamp; and
   a right arm, all connected in series, and said second pin is fastened to said clamp.

* * * * *